Feb. 22, 1955 G. MARCHAND 2,702,440
DEVICE FOR ILLUMINATING PAINTINGS
Filed May 1, 1952 2 Sheets-Sheet 1

INVENTOR.
George Marchand
BY
Andros and Smith

Feb. 22, 1955 G. MARCHAND 2,702,440
DEVICE FOR ILLUMINATING PAINTINGS
Filed May 1, 1952 2 Sheets-Sheet 2
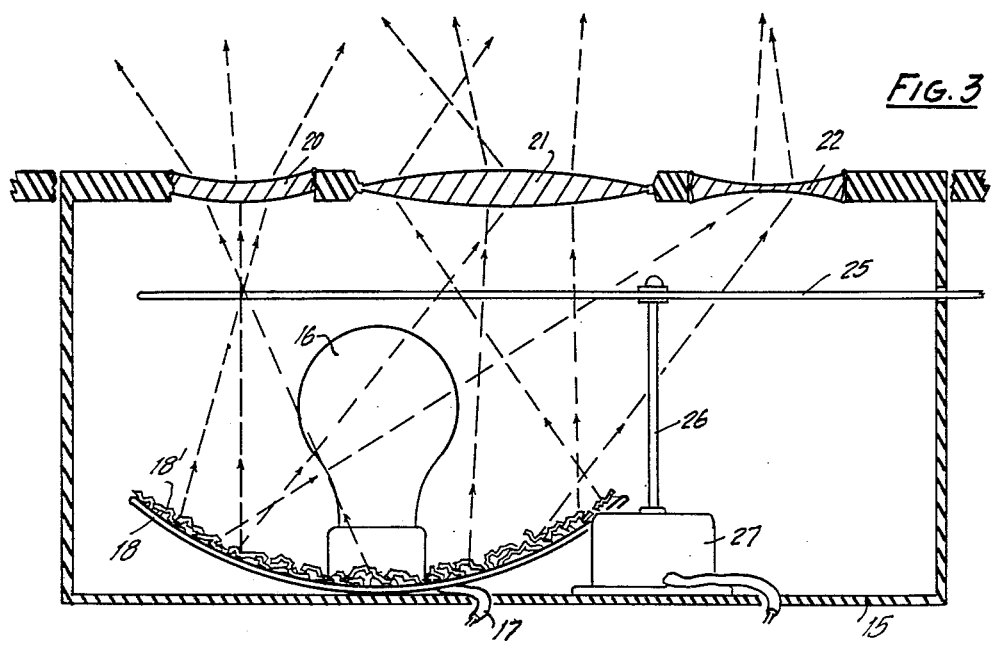
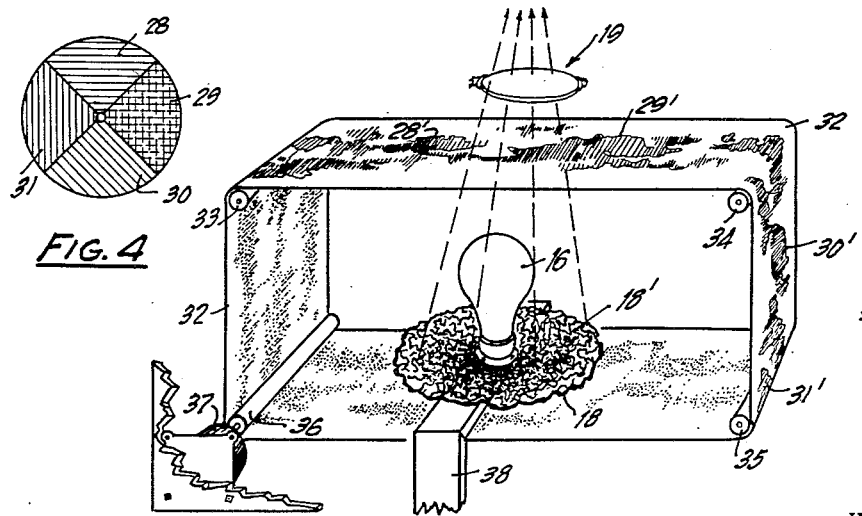
INVENTOR.
George Marchand
BY
Andros and Smith United States Patent Office 2,702,440
Patented Feb. 22, 1955

2,702,440

DEVICE FOR ILLUMINATING PAINTINGS

George Marchand, Ebenezer, N. Y.

Application May 1, 1952, Serial No. 285,375

3 Claims. (Cl. 40—130)

This invention relates to improvements in illuminating devices for paintings such, for example, as those forming the background in dioramas of the general type usually seen in museums. While it is to be understood that my device may be used to produce novel illuminating effects in any type of painting, interior or otherwise, it will be more fully explained hereinafter in connection with a diorama which ordinarily is intended merely to illustrate "still" replicas of figures or scenes of various kinds.

An object of the present invention is the provision of a diorama or other painting displaying gradually changing or animated scenes of sunsets, sun's rays, sparkling water surfaces, clouds, forest fires, moonlight, etc., by the concentration or dispersion of light thereon.

Another object of the invention is the provision of a diorama, or the like, provided with manually adjustable light reflecting means for projecting high lights, etc., in a selected manner on a plane or curved background on which a scene is to be painted, and thereafter painting or building, so to speak, a pattern of light on said background in which the lighting effects thus produced thereon are utilized in determining the general composition of the painting, and particularly the location of the high lights, shadows, etc., therein.

A further object of the invention is the provision of a diorama or the like on which such scenes are depicted in the manner above described, and thereafter animated by means which will provide variations in color or light intensity, or both.

More specifically, it is an object of the invention to provide such a diorama by a combination of a light source and a reflector which can be manually pre-adjusted by distortion, rotation, or otherwise, to project high lights, intermediate, and other lighting effects on selected zones of a visible background, either plane or curved, whereby scenes may be painted on the background in proper relation to the lighting effects, and movable, transparent, color-carrying, or shading, means disposed between the scenes and the light source, whereby the scenes can be animated by changing color combinations, variations in light intensity, or both.

Other objects of the invention will in part be obvious and will in part appear hereinafter.

For a fuller understanding of the nature and objects of the invention, reference should be had to the following detailed description, taken in connection with the accompanying drawings, in which:

Fig. 3 is an enlarged transverse view of the light source and reflector means shown at the bottom of Fig. 2 and illustrating a group arrangement of lenses;

Fig. 4 is a plan view of a rotatable disc provided with a number of different colored screen elements for changing the colors of the scenes depicted in Figs. 1 and 2; and Fig. 5 is a perspective view, with parts broken away, of an endless transparent belt provided with different colored or shaded areas for changing the colors or light intensity, or both, of said scene.

Figure 1:
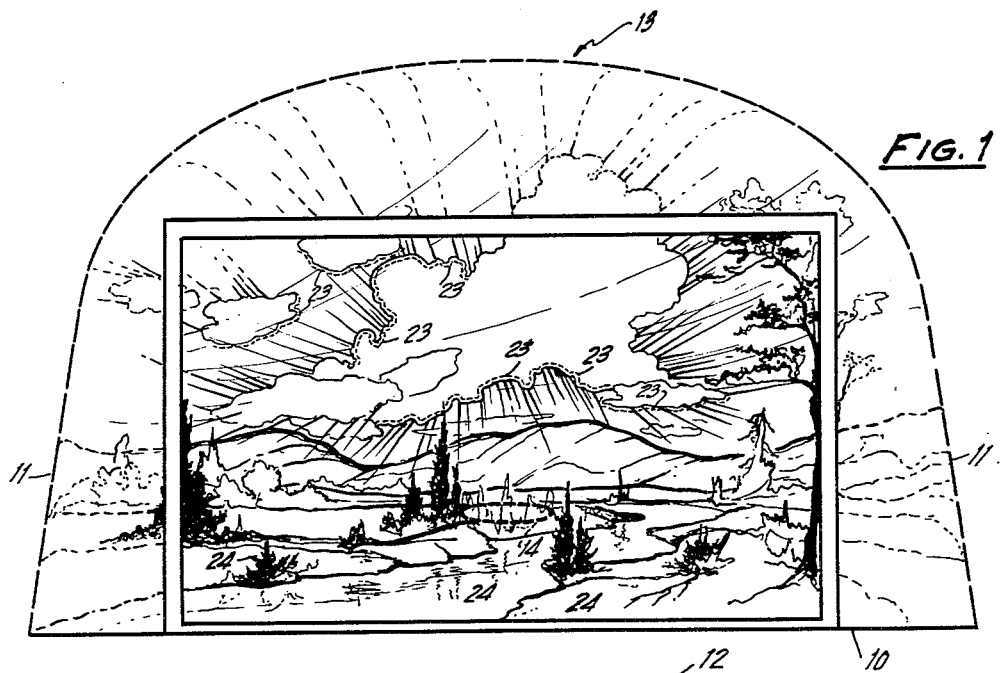
Fig. 1 is a front elevational view of a diorama illustrating an example of the invention.

Referring more particularly to the drawings, there is shown a base member 10 having upwardly and forwardly extending walls 11 and 12 which, in a diorama, form a superstructure 13 of double curvature, to provide a visible background.

The base member has a central opening 14 located toward the background. Surrounding the opening and suspended from the base 10 is a housing 15. Within the housing 15 is a light source as shown by the filament bulb 16 connected to wires 17 adapted to be plugged into a light socket. The light source 16 is in alignment with the aperture 14 so that light rays reflected therefrom will be projected onto the background of double curvature 13.

Below the light source 16 is a reflecting member 18. The reflecting member is mounted below the light bulb and preferably is composed of a material that readily can be distorted. The reflector has an irregular or multiform reflecting surface provided by any suitable material such as tin or aluminum foil 18' which is crinkled and crushed, and secured to the inner dished surface of the reflecting member 18. Such an irregular surface can also be provided by deforming an initially regular reflecting surface, as by denting, pitting, removing or covering portions of said surface with a non-reflecting substance. The reflector is very important because by means thereof, there is provided reflecting surfaces which will reflect, from the light source 16, light rays which will pass through the opening 14 to provide various patterns against the visible background. The reflector 18, when so manipulated, will provide various light patterns from which one may be selected and used to determine the general composition of the particular scene to be painted, and particularly the relative disposition of the high lights, shadows, etc., in the composition. The reflection is then made permanently stationary.

Figure 2:
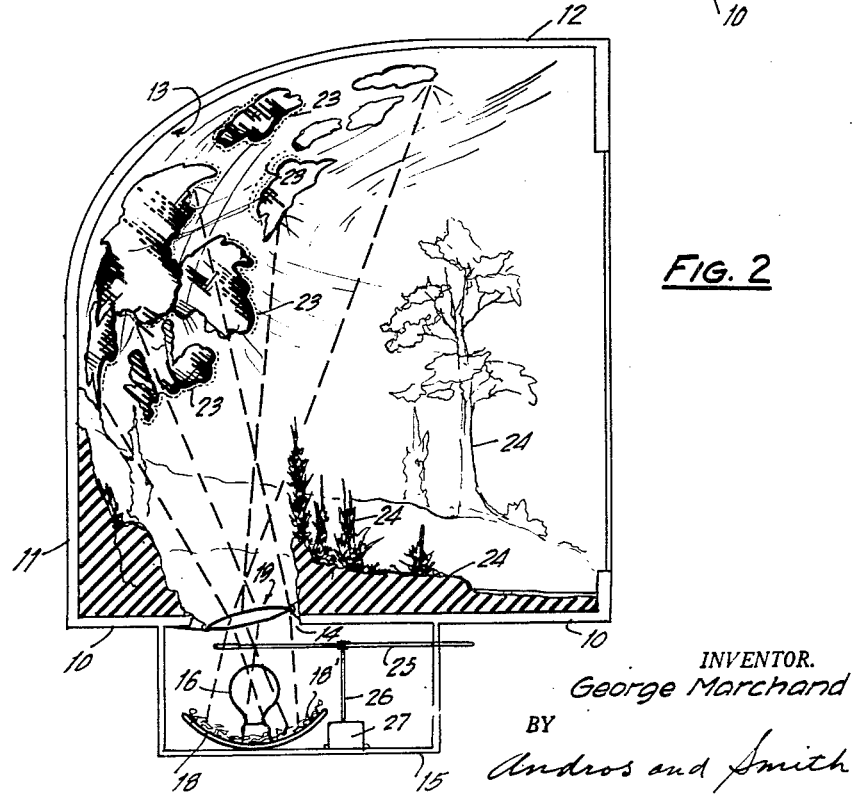
Fig. 2 is a transverse sectional view of Fig. 1 diagrammatically illustrating a lens or group of lenses.

In order to enhance the effect of the light pattern and spread the same over an extended surface area of the background, or to concentrate the light in certain zones, there may be provided a lens, generally indicated at 19 (Figs. 2 and 5) in a somewhat diagrammatic manner, which is adapted to fit into the opening or aperture 14. The lens may be a single or multiple element, and there may be several differently designed lenses as shown at 20, 21 and 22 in Fig. 3, arranged side by side or one above another in any conceivable manner to achieve the desired effect.

The outlines of the high light zones, for example, in the selected light pattern are indicated in the drawings in dotted lines, as at 23. To supplement the selected scene, the foreground of the diorama may be provided by different scenes 24 in three dimensions, reproducing trees, streams, hills, and the like.

In order to animate the selected scenes when painted on the background 13, there is provided a rotatable disc or wheel 25, mounted on a vertically-disposed shaft 26, driven by a motor 27. The disc is of such a diameter that it extends between the light source and reflector 18 and the lens or lenses 19. In the drawing, the disc is shown mounted to one side of the center of the housing and for that purpose a slot is provided in the housing for the disc to swing therethrough where it is desired to confine the housing to the size shown. Mounted within openings in the face of the disc are transparent color elements 28, 29, 30 and 31 which may represent blue, yellow, green and red, or any other colors, respectively. These may be made of any transparent colored or colorless material, or any combination thereof. As the disc 25 is rotated by the motor 27, the selected pattern on the background will change color, thereby producing beautiful and attractive lighting effects for the scene depicted within the diorama. The moving disc also serves to provide gradual or sudden changes of light intensity. Where the diorama is completely enclosed in a cabinet and the bottom edges are light-tight where the dome and base meet, no housing is necessary. In other words, the housing is not always an essential part of the apparatus. Often only a supporting framework may be necessary.

Another means for providing colored effects, and, in particular, gradual and sudden changes of light intensity is shown in Fig. 5 in which an endless belt of transparent material 32 is mounted around elongated idler rollers 33, 34 and 35, and a drive roller 36 connected to the shaft of a motor 37. Such a belt may be made of transparent material, for example, cellophane, and it may be provided with irregular colored areas 28', 29', 30' and 31' depicting, for example, colors such as blue, yellow, green and red, as illustrated in Fig. 4. These colors may be printed on the belt or, if the belt is made of a material such as transparent, or translucent, silk, for example, the same may be dyed, painted or printed with such various colors. Preferably, transparent colored flexible materials are used. If the color is not inherent in the material, dyes, stains or transparent paints may be used. Rippling or changeable effects may be achieved by painting or otherwise placing the desired design on the transparent revolving belt. It will be understood that the belt may be disposed on either side of the lens. Preferably, the rollers are mounted within the housing 15 in such a manner that the upper flight of the belt passes between the lens 19 and the light source 16, the lower flight of the belt passing around the bottom reflector 18 which, in this modification, is illustrated as mounted on an arm 38 holding the reflector and light source in raised position above the bottom of the housing 15.

From the foregoing it will be apparent that my illuminating means may be used to emphasize or enhance the relative intensity and the color of the light which would normally be reflected to the eye of the observer from the different zones of the painting if it were uniformly illuminated, or, particularly to emphasize the high lights of the composition; or to create animated effects such as moonlight on water. Also, by having two color wheels in combination, or combining color wheels and belt, or two belts, an infinite variety of color animation and light intensity can be achieved. The different wheels and belts could be operated at the same or different speeds from the same or different motors. More than one unit can be installed in one diorama in various combinations.

It should be understood that the forms of invention shown and described are to be taken as examples only of the same and that various changes in the size, shape and arrangement of parts may be resorted to without departing from the spirit of the invention or the scope of the appended claims.

I claim:

1. A diorama comprising a base member having a wall extending upwardly therefrom to provide a superstructure forming a visible background, a light source concealed adjacent said base member, a reflector cooperating with said light source and comprising a member of deformable material having an irregular reflecting surface formed to reflect a selected pattern of light rays from said source onto said background; said background having painted replicas, conforming in outline to said pattern, permanently reproduced thereon, means provided with a plurality of zones of varying transparency thereon through which said rays can pass, means movably mounting said means between said light source and said background, and means for moving said first mentioned means on said mounting means to effect gradual and sudden changes in light intensity on said background.

2. A diorama comprising a base member having a wall extending upwardly therefrom to provide a superstructure with a visible background, a light source concealed adjacent said base member, a reflector of deformable material having an irregular reflecting surface cooperatively associated with said light source and shaped to reflect a selected pattern of light rays therefrom onto said background; said background having painted replicas, conforming in outline to said selected pattern, permanently painted thereon, means provided with a plurality of different colors thorugh which said rays may pass, means movably mounting said first mentioned means between said light source and said background, means for moving said first mentioned means on said mounting means to cause changes of color of said painted pattern, and a lens disposed between said light source and said background, whereby to enhance the effect of said light pattern on said background.

3. A diorama comprising a base member having a wall extending upwardly therefrom to provide a superstructure forming a visible background, a light source concealed adjacent said base member, a reflector of deformable material having an irregular, multiform reflecting surface cooperatively associated with said light source and shaped to reflect an irregular pattern of light rays therefrom onto said background; said background having painted replicas, conforming approximately in outline to said irregular patterns, permanently painted thereon; an endless transparent belt, having variously colored areas thereon, means movably mounting said belt to pass between said light source and said background, and means for driving said belt to cause changes of color of said scenic patterns and to effect changes in light intensity thereon.

References Cited in the file of this patent

UNITED STATES PATENTS

| Number | Name | Date |
|---|---|---|
| 731,084 | Taylor | June 16, 1903 |
| 938,142 | Gunther | Oct. 26, 1909 |
| 1,462,946 | Stephens | July 24, 1923 |
| 1,464,054 | Williams | Aug. 7, 1923 |
| 1,729,660 | Farmer | Oct. 1, 1929 |
| 1,905,544 | Wittstein | Apr. 25, 1933 |
| 2,199,308 | Evans | Apr. 30, 1940 |
| 2,211,353 | Solkover | Aug. 13, 1940 |
| 2,587,325 | Husted | Feb. 26, 1952 |